Figure 1:
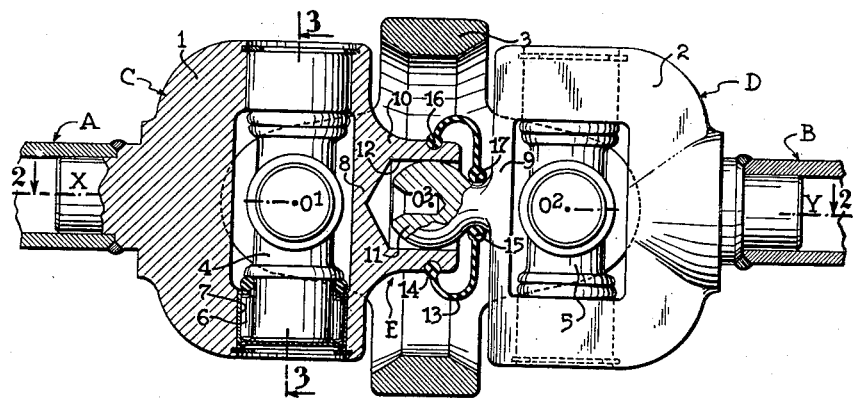

April 17, 1962  R. G. BOUCHARD ET AL  3,029,618
UNIVERSAL JOINT OF THE HOOKE'S TYPE
Filed Dec. 14, 1959  3 Sheets-Sheet 1

April 17, 1962  R. G. BOUCHARD ET AL  3,029,618
UNIVERSAL JOINT OF THE HOOKE'S TYPE
Filed Dec. 14, 1959  3 Sheets-Sheet 2
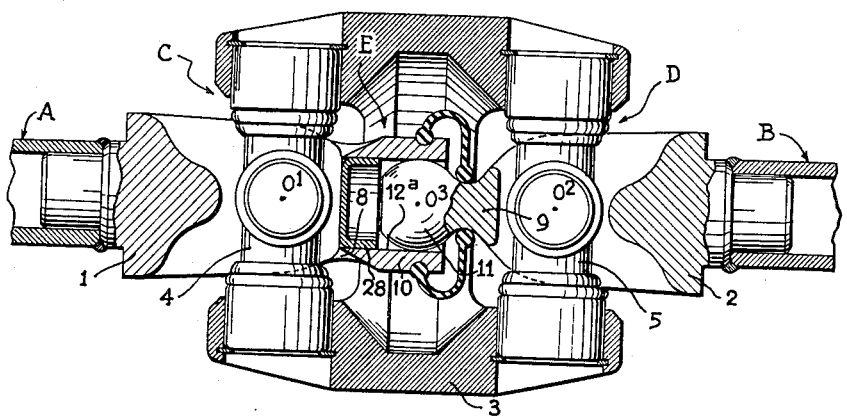
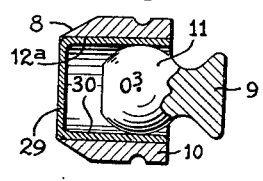
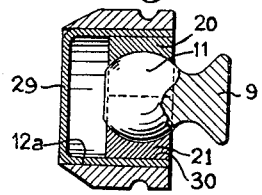
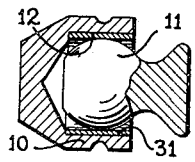

April 17, 1962  R. G. BOUCHARD ET AL  3,029,618
UNIVERSAL JOINT OF THE HOOKE'S TYPE
Filed Dec. 14, 1959  3 Sheets-Sheet 3

United States Patent Office 3,029,618
Patented Apr. 17, 1962

3,029,618
UNIVERSAL JOINT OF THE HOOKE'S TYPE
Robert Gaston Bouchard, Bougival, and Lucien Peras, Billancourt, France, assignors to Societe Anonyme des Roulements a Aiguilles, Rueil-Malmaison, and Regie Nationale des Usines Renault, Billancourt, France, both French companies
Filed Dec. 14, 1959, Ser. No. 859,687
Claims priority, application France Dec. 19, 1958
6 Claims. (Cl. 64—21)

The present invention relates to universal joints of the kind known as Hooke's joint.

These joints, the purpose of which is to ensure a substantially constant velocity transmission for driving and steering vehicle wheels, embody two universal joints coupled together and a ball and socket connection comprising a socket member secured to one of the Cardan yokes and a ball element secured to the other yoke.

In the known Hooke's joints, the ball and socket elements are usually arranged at the end of rods fitted into bores in the yokes of the two joints. The production of a ball and socket joint of this kind is a particularly delicate matter, as it requires drilling the bores in the yokes, which are of a general C-shape.

Moreover, a hole must be provided at the centre of each of the cross-heads providing the four trunnions, to allow passage of these rods and this considerably reduces the mechanical strength of the cross-heads.

The invention aims at overcoming these defects and resides in that the ball and socket elements are respectively integral with extensions of the yokes situated on the side next to the centre of the ball joint with respect to the corresponding cross-head.

According to a preferred embodiment of the invention, each yoke has a general D-shape, that is the ends of the two lugs of the yoke strap are bridged, at the side next to the centre of the ball and socket joint with respect to the corresponding cross-head, by means of an integral transverse member which carries the corresponding element of the ball and socket joint.

The cylindrical bore forming the socket element of the joint may be blind, but it is preferably formed by a bore drilled right through said socket and closed at its free end by a force-fitted stamped plug member.

According to another feature of the invention, a thin-walled cylindrical bush is interposed between the ball and socket elements of the joint, this bush being treated so as to possess the hardness and other required mechanical characteristics. It may form either an extension of the stamped plug member or it may be a separate member which can be inserted in the bore fitted with the plug member, or in a blind bore.

A properly heat-treated bush readily affords the required surface qualities, whereas it is much more difficult to give local treatment to the socket element of the joint itself without affecting the yoke of the universal joint, which should not be hardened.

Furthermore, the provision of a bush facilitates subsequent repairs, by reason of its convenient replacement.

With a view to simplifying the construction and assembly of these universal joints and to facilitating mass production, the double yoke connecting the two cross-heads together preferably consists of a simple sleeve of constant section which can be readily obtained by extrusion, provided at its ends with bores for journalling the cross-head trunnions and with open notches accommodating the necessary angular movements of the yoke.

The bearings for centering the cross-heads are preferably held in the bores of the yokes or of the intermediate double-yoke by beading over, this method of fixing being carried out easily and quickly by symmetrical operations which are cheaper than securing by circlips.

Further features of the invention will be apparent from the following description.

Figure 2:
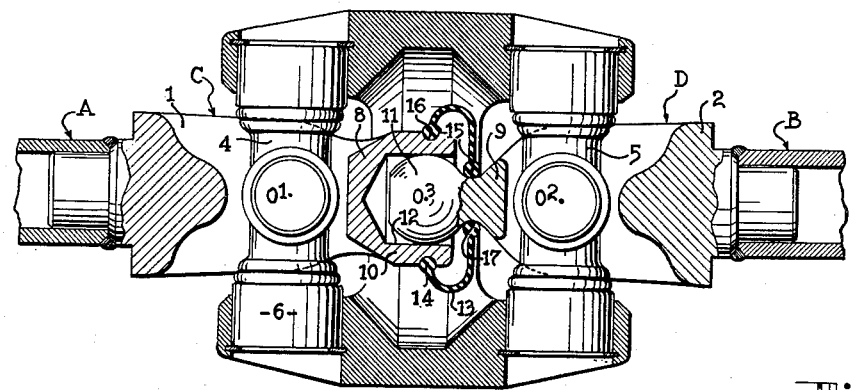
Figure 3:
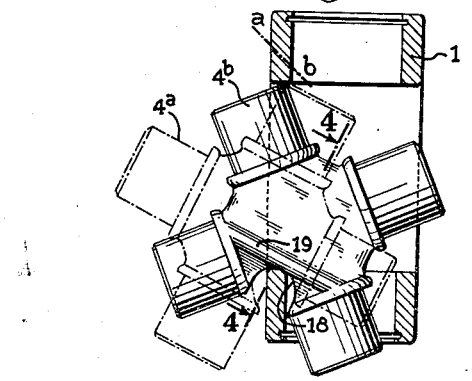
Figure 4:
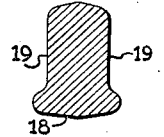
Figure 5:
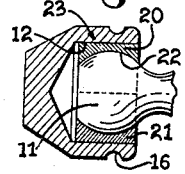
Figure 10:
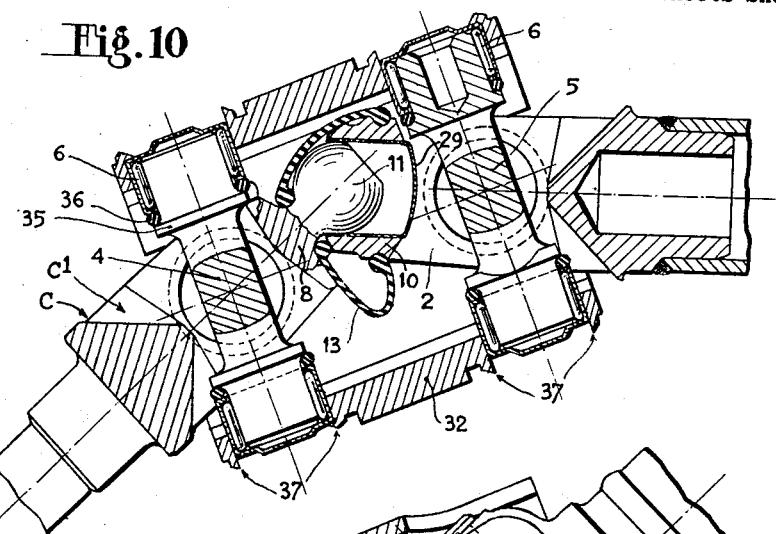
Figure 11:
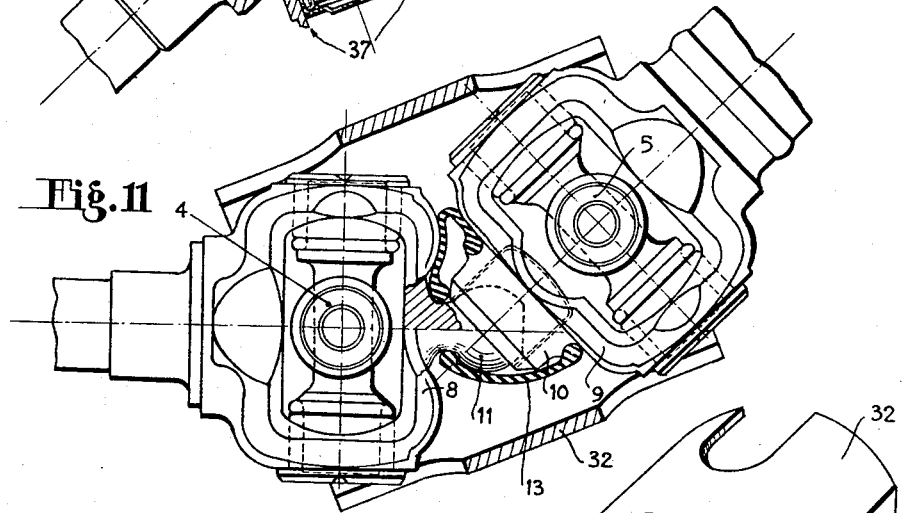
Figure 12:
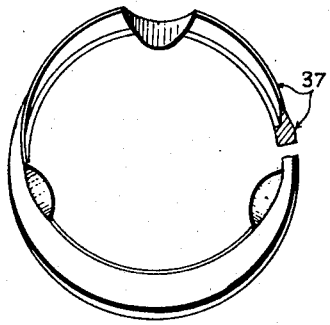
Figure 13:
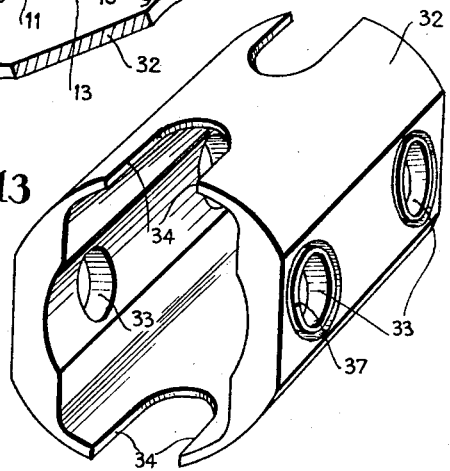

In the accompanying drawing, given solely by way of example:

FIG. 1 is a longitudinal section of an improved universal joint according to the invention;
FIG. 2 is a section along line 2—2 of FIG. 1;
FIG. 3 is a transverse section along line 3—3 of FIG. 1, of one of the universal joints, illustrating the method of mounting the cross-head of this joint;
FIG. 4 is a transverse section of this cross-head along line 4—4 of FIG. 3;
FIG. 5 is a partial longitudinal section of a modified embodiment of the ball and socket device;
FIG. 6 is a view similar to FIG. 2, showing a modified embodiment of the invention, with the socket element drilled right through and closed by a plug member.
FIGS. 7, 8 and 9 are partial sections of modifications of the ball and socket assembly.
FIG. 10 is a view analogous to FIG. 2, illustrating a modified embodiment of the intermediate double yoke of the joint;
FIG. 11 is a similar view of the joint shown in FIG. 10, along a plane at right angles to the preceding one;
FIG. 12 is a perspective view illustrating how the bearings for the cross-head are held in place by beading over, and
FIG. 13 is a perspective view of the intermediate double yoke.

According to the embodiment shown in FIGS. 1 to 4, the Hooke's joint is adapted to operatively connect two rotatable shafts A and B, one of which is a driving shaft and the other one a driven shaft. These shafts, the axes of which are respectively $XO^1$ and $YO^2$, are adapted to oscillate respectively about centres $O^1$ and $O^2$, the distance $O^1O^2$ being constant.

In order that the angular speeds of both shafts should be at any time substantially equal, the Hooke's joint comprises two coupled universal joints C and D and a ball and socket device E providing a third centre of oscillation $O^3$ substantially equidistant from the centres $O^1$ and $O^2$ and forming practically an isosceles triangle with them when the angle formed between the two axes $XO^1$ and $O^2Y$ reaches its maximum value.

Each of the universal joints C and D comprises a yoke 1, 2 rigidly secured to the respective shaft A or B and each of these yokes is operatively connected with an intermediate double yoke 3 by a respective cross-head 4 and 5. Each cross-head has four trunnions diametrically opposite in pairs and whose axes meet at the centre of the cross-head, i.e. the centre $O^1$ or $O^2$ of the corresponding universal joint.

Each cross-head is pivoted by two of its opposite trunnions in the yoke 1 or 2 and by the two other trunnions in the double yoke 3. Preferably, a needle bearing such as 6 is interposed between each trunnion and the corresponding bore 7.

The ends of the two lugs of each yoke 1 and 2 are bridged by an integral transverse member 8 or 9, so that each yoke is D shaped, as shown in FIG. 1. Integral with each transverse member is a boss 10 or 11, extending outwardly. Boss 10 is drilled with a cylindrical bore 12, forming the socket of the ball and socket joint and coaxial with the axis $XO^1$ of the yoke 1. The other boss 11 forms the ball of the ball and socket joint, and has a spherical outer surface, whose centre is $O^3$ and whose diameter is equal to that of the bore 12. Ball 11 may therefore both oscillate about its centre $O^3$ and slide in the socket 12, during the relative angular movements of shafts A and B.

The cavity provided between the end of the bore 12 and the ball element 11 of the joint is adapted to be filled with lubricant and protection against dust and other foreign bodies is ensured by a deformable sealing element 13 of rubber or similar material provided with two openings bounded by reinforced annular portions or beads 14 and 15, fitting respectively in an outer groove 16 of the boss 10 and in the neck 17 where the spherical element 11 joins the transverse member 9.

The two yokes 1, 2 and the portions integral therewith forming the central ball and socket device E are for example of common semi-hard carbon steel. The inner cylindrical surface of the bore 12 and the outer spherical surface of the ball element 11 of the joint may be hardened by any suitable local hardening treatment, including for example a heating with high-frequency electric current, so as to render these contact surfaces sufficiently hard to resist friction and other strains without affecting the yokes which may be readily produced by forging.

The construction above described does away with the machining of the bores, which, in prior constructions, were adapted to receive the rods carrying the elements of the ball and socket joint, and also with the necessity for drilling the cross-heads at their centre to provide passage for such rods. Production of the entire assembly is therefore simplified.

Due to the D-shape of the yokes, the mounting of each cross-head 4, 5 upon the corresponding yoke 1 or 2 cannot be carried out by swinging the cross-head about the axis whose projection is $O^1$ in FIG. 1, as was possible in former constructions, and it must now be swung about the axis $O^1X$, as illustrated in FIG. 3, which shows two successive positions $4^a$ and $4^b$ of the cross-head 4. In order to provide for this swinging motion, the yoke could be cut out at $ab$, but as this section of the yoke is loaded relatively heavily due to the transmission of torque, it is preferred to provide the cross-head with a notch 18 (FIGS. 3, 4) situated between two trunnions. To compensate for the corresponding reduction in section, the central portion of the cross-head is reinforced by two ribs 19 adjacent said notch.

FIG. 5 is a partial section of a modified embodiment wherein, between the ball element 11 and the bore 12, a socket is interposed, which is formed of two anti-friction half-rings 20 and 21 with an internal spherical surface 22 and an outer cylindrical surface 23. This socket may be made of sintered metal for example, and reduces the pressure on the contact surfaces.

Instead of providing a blind hole in the boss 10, the latter may be drilled right through, as indicated at $12^a$ in FIG. 6, and this bore $12^a$ may be obturated by means of a dished or cup-shaped plug member 28 force-fitted into the bore at the end opposite the one receiving the ball element 11.

In the embodiment according to FIG. 7, the cup-shaped plug 29 has a sleeve extension adapted to engage the ball element 11 by its inner surface 30. This plug 29 is obtained by drawing a thin metal sheet and hardening the accurately calibrated stamping (generally by a carbonitriding treatment, according to a well known technique).

This modification has the advantage of dispensing with the hardening treatment of the surface $12^a$ and of facilitating repairs by replacement of the plug 29.

FIG. 8 shows a modification of FIG. 5, in which the hole $12^a$ runs right through and is closed by a plug member 29, the ball element 11 being encaged in two anti-friction half-sockets 20 and 21 which may slide against the inner surface 30 of the plug 29.

FIG. 9 shows another arrangement in which the hole 21 is blind but provided with a ring 31 having inner and outer cylindrical surfaces and in which the ball element 11 may oscillate and slide. By a carbo-nitriding heat treatment or the like, this ring may be given the desired surface characteristics for its cooperation with the ball element 11. Alternatively, as in the foregoing example, two half-sockets may be interposed between the ring 31 and the ball element 11.

FIGS. 10 to 13 show another embodiment in which the intermediate double yoke (similar to member 3 in FIG. 1) is a tubular sleeve having a constant cross-section over its whole length, strengthened on opposite sides in the vicinity of the bearings for the trunnions of the cross-heads. This sleeve, in addition to the apertures 33 accommodating the trunnion bearings, is formed with end open notches 34 of such dimensions as to permit the desired angular movement of the yokes 1, 2.

The cups 6 for the bearings bear against shoulders 35 on the trunnions of the cross-heads through elastic sealing rings 36 and they are secured in the bores of the yokes 1 and 2 and of the double yoke 32 by symmetrically beading over at several points (three for example) at the outer periphery of these bores chamfered, for this purpose at 37 (see detail, FIG. 12). This construction is particularly strong and simple and the number of component parts is quite reduced.

The invention is of course in no way limited to the embodiments shown and described, these having been chosen solely by way of example.

Having now described our invention what we claim as new and desire to secure by Letters Patent is:

1. A universal joint of the Hooke's type, comprising in combination two yokes adapted to be respectively secured to the shafts to be operatively connected, an intermediate double yoke member, two cross heads, each cross-head having two pairs of trunnions whose axes are in a common plane and at right angles to each other, one pair of trunnions being journalled in one yoke and the other pair at one end of said intermediate double yoke member, said yokes having a portion accommodating a corresponding cross-head and an integral depending portion facing the middle of said intermediate double yoke member, the depending portion of one yoke having an integral socket member coaxial with said yoke and the depending portion of the other yoke having an integral ball member coaxial with said other yoke and engaging said socket member and each of said cross-heads having a notch intermediate adjacent trunnions, of such depth that each cross-head can be mounted with its trunnions engaging their bore in the corresponding yoke by a rotation about the axis of the yoke.

2. A universal joint as claimed in claim 1, wherein each of said cross-heads has a rib on each side of said cross-head, adjacent said notch, to compensate for the reduction of section produced by said notch.

3. A universal joint of the Hooke's type, comprising in combination two yokes adapted to be respectively secured to the shafts to be operatively connected, an intermediate double yoke member, two cross-heads, each cross-head having two pairs of trunnions whose axes are in a common plane and at right angles to each other, one pair of trunnions being journalled in one yoke and the other pair at one end of said intermediate double yoke member, said yokes having a D-shape and comprising a C-shaped portion accommodating a corresponding cross-head and an integral bar bridging the ends of said C-shaped portion, the bridging bar of one yoke having an integral socket member coaxial with said yoke, the cylindrical bore of said socket extending right through said socket member and said bar, and the bridging bar of the other yoke having an integral ball member coaxial with said other yoke and engaging said socket member, and a cup-shaped plug obturating the opening of said bore which is remote from said ball member, each of said cross-heads having a notch intermediate adjacent trunnions, of such depth that each cross-head can be mounted with its trunnions engaging their bore in the corresponding yoke by a rotation about the axis of yoke.

4. A universal joint of the Hooke's type, comprising in combination two yokes adapted to be respectively secured to the shafts to be operatively connected, an intermediate double yoke member consisting of an extruded sleeve having a constant section throughout its length and thicker opposite wall sections, two cross-heads, each cross-head having two pairs of trunnions whose axes are in a common plane and at right angles to each other, one pair of trunnions being journalled in one yoke and the other pair near one end of the opposite thicker wall sections of said intermediate double yoke member, said yokes having a D-shape and comprising a C-shaped portion accommodating a corresponding cross-head and an integral bar bridging the ends of said C-shaped portion, the bridging bar of one yoke having an integral socket member coaxial with said yoke and the bridging bar of the other yoke having an integral ball member coaxial with said other yoke and engaging said socket member, and two open notches at each end of said intermediate double yoke member, at 90° from the corresponding cross-head trunnions, of such width and depth as to provide for the oscillations of said yokes relatively to said intermediate double yoke member.

5. A universal joint of the Hooke's type, comprising in combination two yokes adapted to be respectively secured to the shafts to be operatively connected, an intermediate double yoke member, two cross-heads, each cross-head having two pairs of trunnions whose axes are in a common plane and at right angles to each other, one pair of trunnions being journalled in one yoke and the other pair at one end of said intermediate double yoke member, said yokes having a D-shape and comprising a C-shaped portion accommodating a corresponding cross-head and the parallel strap portions of which are formed with coaxial bores, and an integral bar bridging the ends of said C-shaped portion, the bridging bar of one yoke having an integral socket member coaxial with said yoke and the bridging bar of the other yoke having an integral ball member coaxial with said other yoke and engaging said socket member, antifriction bearings fitting in the bores of said yokes and over the respective trunnions, chamfered ridges projecting outwardly around said bores, and beaded over the latter at a number of symmetrically arranged points to retain said bearings in place, each of said cross-heads having a notch intermediate adjacent trunnions, of such depth that each cross-head can be mounted with its trunnions engaging their bore in the corresponding yoke by a rotation about the axis of the yoke.

6. A universal joint as claimed in claim 3, further comprising a flexible sealing member having a beaded end portion engaging an annular recess at the periphery of said socket member, a beaded end portion engaging the root of said ball member and an intermediate web portion screening the opening of said socket portion around said ball member.

References Cited in the file of this patent
UNITED STATES PATENTS

| | | |
|---|---|---|
| 1,979,768 | Pearce | Nov. 6, 1934 |
| 2,010,899 | Rzeppa | Aug. 13, 1935 |
| 2,331,982 | Johnson | Oct. 19, 1943 |
| 2,903,868 | Stillwagon | Sept. 15, 1959 |